United States Patent [19]

Jackson

[11] Patent Number: 4,635,969
[45] Date of Patent: Jan. 13, 1987

[54] ROTARY JOINT WITH BALANCED SEALS

[75] Inventor: Eldon D. Jackson, Three Rivers, Mich.

[73] Assignee: The Johnson Corporation, Three Rivers, Mich.

[21] Appl. No.: 739,862

[22] Filed: May 31, 1985

[51] Int. Cl.[4] .................................................. F16L 39/04
[52] U.S. Cl. ........................................ 285/95; 285/134; 285/190
[58] Field of Search ................ 285/134, 136, 190, 281, 285/108, 267, 95

[56] References Cited

U.S. PATENT DOCUMENTS

| | | | |
|---|---|---|---|
| 2,270,927 | 1/1942 | Browne | 285/190 |
| 2,496,471 | 2/1950 | Hornbostel | 285/134 |
| 2,700,558 | 1/1955 | Hieronymus | 285/10 |
| 2,805,086 | 9/1957 | Shumaker | 285/134 |
| 2,805,087 | 9/1957 | Shaw et al. | 285/134 |
| 3,594,019 | 7/1971 | Gotschall | 285/14 |
| 3,874,707 | 4/1975 | Calkins | 285/93 |
| 4,051,604 | 10/1977 | Fleissner | 285/134 |
| 4,194,767 | 3/1980 | McCracken | 285/190 |
| 4,254,972 | 3/1981 | Wiedenbeck et al. | 285/134 |
| 4,262,940 | 4/1981 | Wiedenbeck et al. | 285/61 |

FOREIGN PATENT DOCUMENTS

| | | | |
|---|---|---|---|
| 939186 | 2/1956 | Fed. Rep. of Germany | 285/134 |
| 2100579 | 7/1971 | Fed. Rep. of Germany | 285/190 |
| 935103 | 6/1948 | France | 285/134 |

Primary Examiner—Cornelius J. Husar
Assistant Examiner—Anthony Knight
Attorney, Agent, or Firm—Beaman & Beaman

[57] ABSTRACT

A rotary joint for use with rotating heat exchanger drums particularly suitable for installations utilizing higher fluid pressures, temperatures and rotative speeds. The joint includes a nipple mounted upon the drum shaft having an enlarged diameter portion within a body chamber upon which a pair of seals are mounted having differential pressure faces to balance fluid medium pressures imposed upon the seals, seal wear does not produce relative axial displacement between the nipple and body, and concentric alignment between the nipple and body is maintained by axially spaced alignment bushings interposed therebetween.

6 Claims, 1 Drawing Figure

ROTARY JOINT WITH BALANCED SEALS

BACKGROUND OF THE INVENTION

Rotary joints are employed with rotating heat exchanger drums as commonly used in the manufacture of paper wherein steam is introduced into a rotary drum and the condensate removed therefrom, or cooling water is circulated through the drum. Rotary joints permit the fluid medium to communicate with fixed conduit systems and be circulated through the dynamic heat exchanger.

Rotary joints often include an elongated nipple which is concentrically affixed to the drum shaft or journal in communication with the drum interior and the joint body or housing is mounted upon the nipple for relative rotation thereto, the body being fixed and communicating with stationary supply and drainage conduit systems, and seals and bearings are interposed between the nipple and body to maintain the interrelationship between these components for producing a fluid-tight relationship therebetween. Examples of rotary joints developed by the assignee are shown in U.S. Pat. Nos. 3,594,019 and 4,262,940.

As the seals within the rotary joint body are subjected to the pressure of the fluid therein, such pressure often imposes a force on the seal which increases the pressure at the seal face thereby accelerating wear and increasing the torque requirements for rotating the nipple relative to the body. Various types of compensating structure has been proposed for reducing seal wear due to internal pressures such as shown in assignee's U.S. Pat. Nos. 2,700,558 and 3,874,707. However, the structure of the joints shown in such patents do not completely eliminate the seal wear problems due to internal fluid pressures.

It is an object of the invention to provide a rotary joint particularly suitable for use with higher pressure, temperature and speed installations wherein the joint is relatively economical to manufacture and assemble, and may be readily serviced.

Another object of the invention is to provide a rotary joint employing a rotating nipple having a joint body mounted thereon wherein seals interposed between the nipple and body are mounted upon an enlarged portion of the nipple and are of such a configuration as to be substantially balanced with respect to the influence of the fluid pressures being imposed thereon to reduce seal wear and operating torque requirements.

A further object of the invention is to provide a rotary joint utilizing a relatively rotating nipple and body wherein a pair of substantially balanced seals are mounted upon the nipple and are biased in opposite axial directions against seal faces defined on the body.

An additional object of the invention is to provide a rotary joint utilizing a relatively rotating nipple and body wherein axially displaceable seals mounted upon the nipple within the body are substantially balanced and biased in opposite axial directions against seal faces formed on the body and alignment bushings interposed between the nipple and body prevent radial displacement between these components.

Another object of the invention is to provide a rotary joint utilizing a relatively rotating nipple and body wherein opposed axially displaceable seals mounted upon the nipple engage body sealing faces and during seal wear relative axial displacement of the body and nipple is prevented permitting syphon pipe structure mounted within the nipple to be truly static and free of axial displacement during seal wear.

In the practice of the invention, an elongated tubular nipple is attached concentrically to the end of the dryer drum shaft in a known manner. The nipple includes an enlarged central region located between cylindrical regions of lesser diametrical dimension and the enlarged portion includes a radially extending flange and a diametrical portion on each axial side of the flange upon which annular seals are located for axial displacement on the nipple in opposite directions.

A stationary body circumscribes the nipple defining a chamber in which the nipple enlarged portion is located. An inlet port is defined in the body communicating with the chamber, and radial orifices formed in the enlarged portion of the nipple establish communication between the body chamber and nipple bore.

The ends of the body are enclosed by annular plates which circumscribe the nipple. A wear plate is removably bolted to the side of the body disposed toward the heat exchanging drum, while an assembly plate is bolted to the outer side of the body. Each of these plates include an annular alignment bushing or bearing engaging reduced diameter portions of the nipple wherein a concentric radial relationship between the nipple and body will be maintained during installation and provide radial orientation between the nipple and body during operation.

The inner radial surfaces of the wear and assembly plates constitute flat seal faces each engaged by an annular carbon seal mounted upon opposite axial sides of the nipple flange and sealed with respect to the nipple cylindrical surfaces upon which they are mounted, but the seals are capable of axial displacement on these surfaces. Each seal includes a first annular pressure face disposed adjacent the nipple flange, and each seal includes a radial annular shoulder facing its associated body plate forming a second pressure face wherein the forces imposed upon the pressure faces of each seal by the fluid medium are in opposed axial direction and tend to balance each other with respect to seal axial displacement. The area of the first seal faces adjacent the flange is slightly greater than the shoulder area of the second seal faces disposed toward the associated body plate whereby a slightly greater force is imposed upon the seal toward the associated plate to assure effective fluid-tight sealing. The seals are keyed to the nipple flange by dowel pins which prevent rotation of the seals on the nipple, but permit axial displacement as seal wear occurs.

The nipple extends completely through the joint body permitting spaced axial engagement between the nipple and body by alignment bushings providing resistance to relative bending forces as well as radial orientation, and as the wear occurring in the seals does not result in relative axial displacement between the nipple and body the axial orientation of the nipple and body remains constant throughout the life of the rotary joint and this relationship is of particular advantage when a drum syphon pipe is located within the nipple and sealed with respect thereto. This "fixed" relationship of the body provides superior sealing between the syphon pipe and nipple throughout the joint life. When a syphon pipe is used with the nipple, a conduit fitting component, such as an elbow, is mounted upon the body in communication with the outer end of the nipple and syphon pipe.

BRIEF DESCRIPTION OF THE DRAWING

The aforementioned objects and advantages of the invention will be appreciated from the following description and accompanying drawing wherein.

DESCRIPTION OF THE PREFERRED EMBODIMENT

Figure 1:
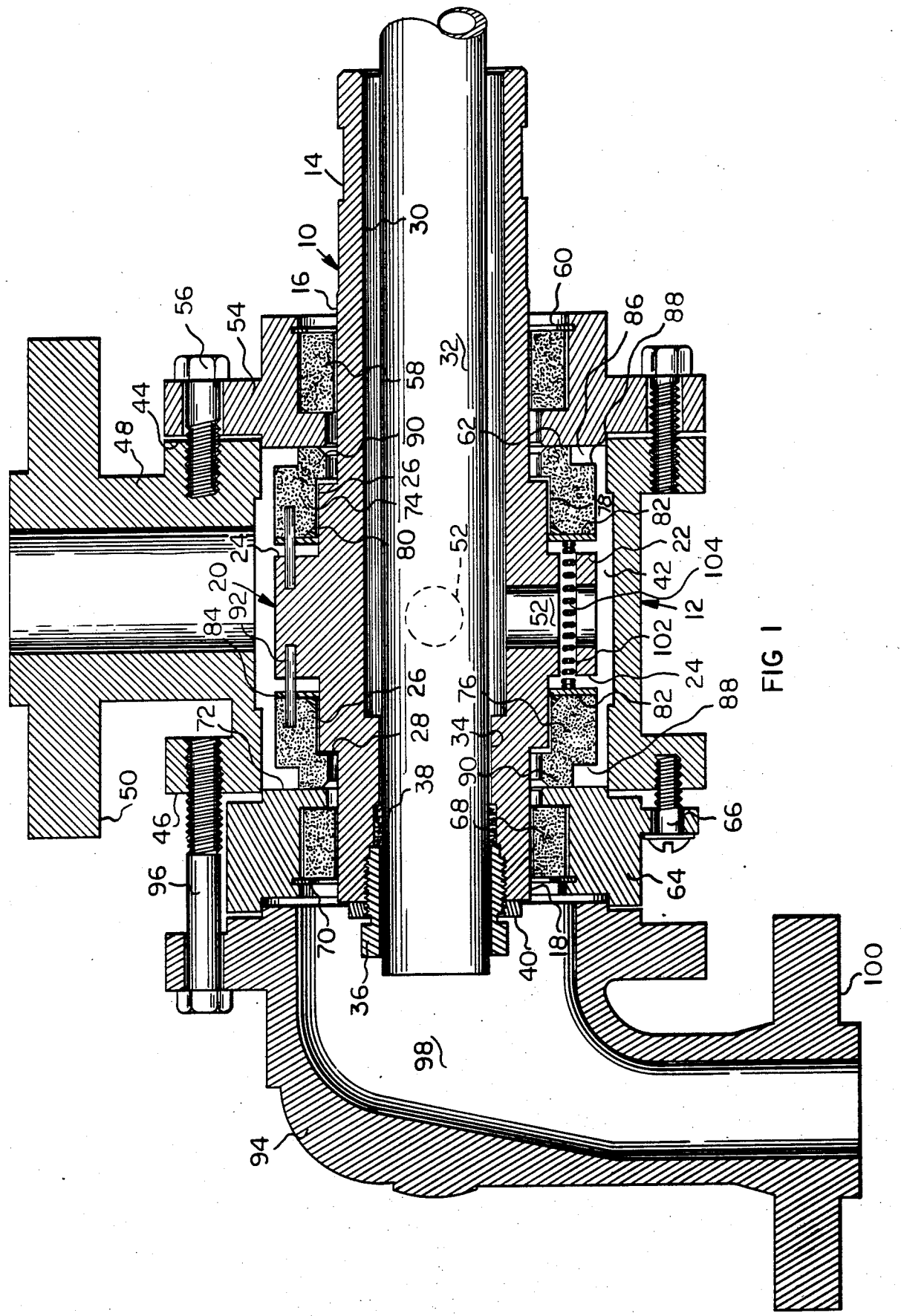
FIG. 1 is an elevational, sectional view of a rotary joint incorporating the inventive concepts of the invention.

A rotary joint in accord with the invention basically includes a nipple 10 and a joint body or housing 12. The nipple 10 is mounted to the drum structure for rotation therewith, while the body 12 is stationary and is connected to the conduit system or systems for supplying steam or draining condensate. The inner end of the nipple is provided with a groove 14 for permitting the nipple to be coaxially attached to the heat exchanger drum shaft, and support structure is utilized with the body 12 for supporting the body. The means for attaching the nipple to the dryer drum, and supporting the body 12, may be of conventional form such as shown in the assignee's U.S. Pat. Nos. 3,594,019 and 4,262,940, and the teachings of these patents in this regard is incorporated by reference.

The tubular nipple 10 includes cylindrical portions 16 and 18 of equal diameter, and intermediate these portions an enlarged nipple portion 20 is defined which includes the central radial flange 22 defined by annular radial side surfaces 24, and cylindrical surfaces 26 are defined on each axial side of the flange 22 of a diameter larger than that of the portions 16 and 18. The axial extent of the surfaces 26 is defined by the radial shoulders 28.

Internally, the nipple 10 includes a bore 30, and in FIG. 1 the nipple configuration illustrated is that which accommodates a drum syphon pipe 32, and accordingly, the nipple bore includes the reduced diameter 34 for receiving the outer end of the syphon pipe and the nipple is countersunk and threaded for receiving the threaded packing gland 36 which compresses packing 38 to establish a fluid-tight seal between the syphon pipe and the nipple wherein these components will rotate together. Lock nut 40 threaded upon packing gland 36 will prevent inadvertent loosening of the gland.

The body 12 is of cast metal and includes a generally cylindrical chamber 42 having an axis coincident with the axis of drum rotation and the axis of the nipple 10. The chamber 42 intersects the sides 44 and 46 of the body and an inlet neck and passage 48 communicates with the chamber wherein a steam supply line, not shown, may be attached to the body by means of flange 50. The nipple portion 20 is provided with radial orifices 52 for establishing communication between the body chamber 42 and the nipple bore 30.

An annular wear plate 54 is attached to the body side 44 by a plurality of bolts 56. The wear plate includes a countersunk recess receiving the annular alignment bushing 58 therein which is retained by snap ring 60. The inner diameter of the bushing 58 substantially corresponds to that of nipple portion 16 wherein the bushing maintains the radial relationship between the wear plate and nipple. Internally, the wear plate is provided with a radial flat seal face 62 which defines the right end of the chamber 42 as viewed in the drawing.

The left end of the chamber 42 is defined by the annular assembly plate 64 which is bolted to the body side 46 by bolts 66. The assembly plate 64 includes a countersunk recess receiving the annular alignment bushing 68 which is held in position by the retaining ring 70 and the bushing closely engages the nipple cylindrical portion 18 wherein together, the bushings 58 and 68 radially position the nipple 10 relative to the body 12, and due to their axial separation the bushings are effective to resist bending forces transverse to the nipple length. The assembly plate 64 includes a flat radial seal face 72 which defines the left end of the chamber.

A pair of identical carbon seals 74 and 76 are mounted upon the nipple enlarged portion 20. Each of the seals 74 and 76 is of an annular configuration and includes an inner cylindrical bore 78 slightly larger in diameter than the nipple cylindrical surfaces 26. A high temperature seal ring 80 is located adjacent the seal bore 78 at the intersection with the seal inner radial face 82, and an annular steel washer 84 is located adjacent each seal faces 82 and maintains the seal ring 80 in position. For purpose of description and claiming the seal face 82 is considered the inner pressure face of the associated seal.

Each of the seals 74 and 76 is also provided with an outer annular recess 86 defining radial shoulder pressure face 88 perpendicularly disposed to the axis of the nipple length. The shoulder face 88 defines an outer pressure face for each seal, and the area of the face 88 is slightly less than the area of the inner face 82. Each seal includes an axially extending lip or extension 90 defined by recess 86 which includes a radial flat surface for sealingly engaging the associated face 62 of the wear plate 54 or the face 72 of the assembly plate 64 as will be apparent from the drawing.

Four axially extending dowel pins 92 are mounted within blind holes defined in each side 24 of the nipple flange 22, and these dowel pins are received within four axial aligned holes formed in the seals 74 and 76 in alignment with holes defined in the washers 84. The dowel pins 92 are spaced at 90° intervals about the axis of the nipple to key the seals to the nipple to prevent relative rotation thereto, but the pins allow axial movement of the seals on the nipple.

An elbow fitting 94 is bolted to the outer side of the assembly plate 64 by bolts 96 and the elbow includes a chamber 98 communicating with the end of the syphon pipe 32 wherein condensate flowing through the syphon pipe is received within the elbow and discharged through the drain system, not shown, affixed to the elbow by flange 100.

When installing the rotary joint, the alignment bushings 58 and 68 will maintain concentricity between the nipple 10 and the body 12, and the alignment bushings will maintain this concentricity during the operation of the joint, and external loads imposed upon the joint in a radial direction from piping will be absorbed by the support structure for the body and the alignment bushings and nipple.

The fluid pressure, usually steam, entering the chamber 42 through inlet passage 48 passes into the drum through the nipple orifices 52 and nipple bore 30. The inner end pressure faces 82 of the seals 74 and 76 will be exposed to the pressure medium within chamber 42, as will the outer pressure faces 88, and as these forces on a common seal are in opposed axial directions, the seals are each substantially "balanced" preventing excessive pressure between the seal lips 90 and the associated plate seal surface 62 and 72. The fact that the pressure face 82 is of greater area than pressure face 88 will permit the fluid medium to maintain an effective engagement between the seals and the plates, but the unit pressure on the seal lip is not excessive even though the fluid pressure may be relatively high. Accordingly, the construction of the invention provides extended wear life of the seals, and also reduces the friction between the seals 74 and 76 and body 12 minimizing the torque requirements for the rotary joint.

A plurality of equally circumferentially spaced axial holes 102 are defined in the flange 22 at six locations intersecting the flange sides 24 and parallel to the nipple length. A compression spring 104 is received within each of the holes 102 and is of such length as to engage the washers 84 of the seals 74 and 76 and thereby impose an "outward" biasing force on the seals to force the seals away from each other and toward their associated wear or assembly plate. The springs 104 insure a sealing relationship between the seals and body prior to the pressurization of the joint, and during operation, and the washers 84 protect the seals from abrasion by the springs.

It will be noted that the nipple 10 extends completely through the joint body 12 and assembly plate 64. This construction provides superior operating and concentricity characteristics in view of the use of the alignment bushings 58 and 68 and as the wear of the seals 74 and 76 causes only outward movement of the seals relative to the nipple flange 22, no relative axial displacement occurs between the nipple and body due to seal wear. Thus, there is a static relationship between the syphon pipe 32 and nipple, regardless of seal wear, avoiding many of the problems that previously occurred with syphon pipes.

In the disclosed embodiment a syphon pipe is illustrated, but it is to be understood that the inventive concepts can be used with a rotary joint capable of handling only a single flow path wherein the syphon pipe is not present. In such instance, the outer end of the nipple 10 would be solid, or a plug inserted in the nipple to replace the gland 36, and the fitting 94 would not be employed.

As the fitting 94, assembly plate 64 and wear plate 54 may be readily disassembled from the body 12, the seals 74 and 76 and alignment bushings 58 and 68 may be easily replaced and the construction of the invention is such to provide ease of assembly and maintenance even while the joint is mounted upon a dryer drum.

It is to be appreciated that various modifications to the inventive concepts may be apparent to those skilled in the art without departing from the spirit and scope of the invention.

I claim:

1. A rotary joint for use with a rotary heat exchanger drum particularly suitable for use with a high pressure fluid medium comprising, in combination, an elongated tubular one-piece nipple adapted to be coaxially attached to a drum shaft for rotation therewith about the drum axis of rotation, said nipple including an inner cylindrical end region, an outer cylindrical end region and a central region, said central region being of a greater diameter than the diameter of said end regions and including a central radial flange having opposed, axially spaced radial sides, a cylindrical surface defined upon said central region adjacent each flange side of a diameter greater than that of said nipple end regions, a body having first and second ends and a chamber defined therein intersecting said ends, an inlet defined in said body in communication with said chamber, said nipple central region being located within said chamber and said inner end region being exteriorly located with respect to said body, an annular wear plate mounted upon said body first end, an annular assembly plate mounted upon said body second end, said nipple inner end region extending through said wear plate, said nipple outer end region extending into said assembly plate, inner radial seal faces defined upon said plates within said chamber, axially spaced annular bushings interposed between said wear plate and nipple inner end region and said assembly plate and nipple outer end region, respectively, first and second annular seals sealingly mounted upon said nipple central region for axial displacement thereon and axially spaced from each other, one of said seals being mounted upon each cylindrical surface defined adjacent each flange side whereby said seals are located upon opposite sides of said flange, said first seal sealingly engaging said wear plate seal face and said second seal sealingly engaging said assembly plate seal plate, each of said seals having a radial first pressure face and a radial second pressure face in opposed relation and exposed to the fluid pressure within said chamber, the area of said first pressure faces being slightly larger than the area of said second pressure faces whereby the fluid pressure of said first pressure faces forces said seals toward their associated plate seal face, and an orifice defined in said nipple central region establishing communication between said chamber and the interior of said nipple.

2. In a rotary joint as in claim 1, keying means interposed between said nipple central flange and said seals preventing rotation of said seals relative to said nipple.

3. In a rotary joint as in claim 1, springs mounted on said nipple central flange engaging said seals biasing said seals toward their associated plate.

4. In a rotary joint as in claim 1, at least one axially extending pin mounted in each side of said flange received within an axially extending hole defined in the adjacent seal whereby said pins prevent relative rotation between said nipple and seals.

5. In a rotary joint as in claim 1, a plurality of axially extending bores defined in said flange sides in axial alignment with said annular seals, and a compression spring within each of said bores engaging the adjacent seal and biasing said seal toward its associated plate.

6. In a rotary joint as in claim 5, wherein said flange bores extend through said flange and intersect each flange side, and a single compression spring engages both seals.

* * * * *